Sept. 21, 1954
W. H. DAVIS
2,689,624
ABSORPTIVE SEPARATION OF METHANE AND HYDROGEN
Filed April 26, 1951
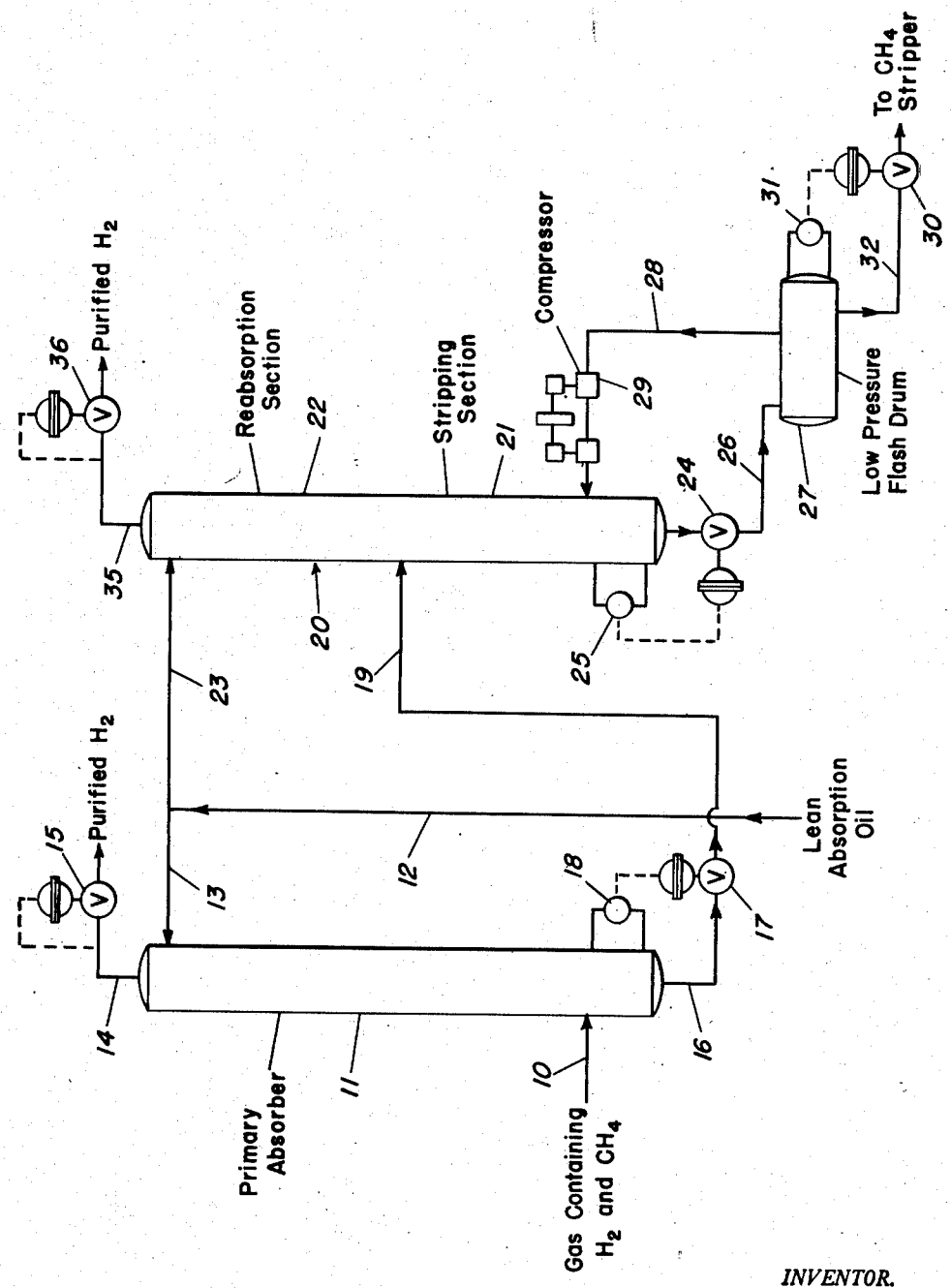
INVENTOR.
WILLIAM H. DAVIS
BY
Busser and Harding
ATTORNEYS Patented Sept. 21, 1954

2,689,624

UNITED STATES PATENT OFFICE 2,689,624

ABSORPTIVE SEPARATION OF METHANE AND HYDROGEN

William H. Davis, Bala Cynwyd, Pa., assignor to Sun Oil Company, Philadelphia, Pa., a corporation of New Jersey Application April 26, 1951, Serial No. 223,042

1 Claim. (Cl. 183—115)

This invention relates to the separation of gases and more particularly to an improved process for separating hydrogen from gas mixtures also containing methane with or without higher boiling hydrocarbon gases.

In refinery practice various processes commonly employed yield by-product gases containing hydrogen in admixture with methane and other light hydrocarbons such as ethylene, ethane, propylene, propane, butylenes, butadienes, butanes, etc. Examples of such processes are thermal cracking, catalytic cracking, hydroforming, platforming and the like. It is desirable to separate and recover the hydrogen from such gases for use in other refinery operations, such as in hydrogenation processes.

Conventional procedure in separating the components of refinery gas involves the use of an absorption step in which heavier components are, to an extent, absorbed selectively from lighter components by means of an absorption oil, followed by various stripping and rectification steps for separating the absorbed components from each other. In treating the rich absorption oil it is customary to selectively strip the lighter component or components therefrom by means of a tower which is operated in a manner to effect fractionation so as to leave heavier components dissolved in the oil. The partially stripped oil is then introduced into a second tower where the heavier absorbed components are removed. In the selective stripping step the rich oil generally is heated prior to its introduction into the tower and a conventional reboiler is provided at the base of the tower to supply additional heat for the stripping operation.

The foregoing conventional procedure in which the selective stripping is done at elevated temperature is not suitable for effectively separating hydrogen from methane, for the reason that fractionation between these two components at elevated temperatures is extremely poor. This is due to the fact that the volatility of hydrogen decreases as the temperature increases above ordinary or normal temperature whereas the volatility of methane is substantially unaffected by such increasing temperature. Consequently there is little if any selectivity between hydrogen and methane at temperatures commonly employed in the stripping and reboiling operation.

The present invention is directed to an improved process for separating hydrogen from methane. According to the invention the rich absorption oil containing hydrogen and methane is passed without substantial heating into a fractionating system in which hydrogen is selectively stripped from the oil and fractionated from the methane without substantial addition of heat at the reboiler. This is accomplished by introducing the rich oil into a tower the upper portion of which constitutes a hydrogen enriching section and the lower portion of which constitutes a selective stripper. Absorption oil from the base of the tower is passed into a flash zone wherein it is subjected to a reduced pressure adapted to cause partial vaporization of the absorbed gas. The vaporized gas is then compressed and returned to the lower part of the tower to serve as stripping medium for selectively removing hydrogen from the downflowing absorption oil. Relatively high temperatures in the system are thus avoided, with the result that effective fractionation between hydrogen and methane is achieved.

The invention is more specifically illustrated in the accompanying drawing which is a diagrammatic flowsheet illustrating an arrangement of apparatus for conducting the process.

Referring to the drawing, charge gas is fed through line 10 into the lower part of a primary absorber 11 and flows upwardly therethrough countercurrent to a suitable absorption medium, such as the usual absorption oil used in refinery practice, which is introduced into the upper part of the tower by means of lines 12 and 13. The charge gas comprises hydrogen and methane and may or may not contain higher boiling hydrocarbon gases including olefinic components. Operating conditions within tower 11 preferably are maintained such as to effect absorption of at least a major proportion of the methane present in the charge; but as a practical matter essentially complete absorption of methane generally will not be effected. From the top of the tower the unabsorbed gas which is composed mainly of hydrogen together usually with a minor amount of methane passes through line 14, the rate of withdrawal being controlled by back pressure control valve 15.

The rich absorption oil from the base of tower 11 flows through line 16 and valve 17 which is regulated by means of level controller 18, and is then introduced without substantial heating through line 19 into a second tower 20 at an intermediate level. The portion of tower 20 below the feed line constitutes a stripping section 21 while the upper portion constitutes an enriching zone illustrated in the drawing as a reabsorption section 22. Additional lean absorption oil is fed by means of lines 12 and 23 into the upper part of the reabsorption section and flows downwardly therein to selectively absorb methane from upflowing hydrogen. From the top of the tower gas composed mainly of hydrogen is withdrawn through line 35 and back pressure valve 36.

From the base of tower 20 partially stripped absorption oil is removed through pressure reducing valve 24 at a rate regulated by level controller 25 and passes through line 26 into a low pressure flash drum 27. Partial vaporization of the absorbed gas occurs within flash drum 27 essentially by reason of the reduced pressure and without substantial application of heat. The vaporized gas flows through line 28 to a compressor 29 wherein it is raised sufficiently in pressure for reintroduction into the lower part of stripping section 21. The returned gas thus acts as stripping medium for selectively removing hydrogen from the downflowing absorption oil. The amount of gas recycled in this manner is so regulated by means of compressor 29 as to achieve the desired degree of stripping of the absorption oil before it leaves the base of the tower.

Absorption oil containing dissolved methane is removed from flash drum 27 by means of valve 30 and controller 31 through line 32, and may then be subjected to additional stripping and fractionating operations (not shown) for separating methane and any higher boiling hydrocarbons which were present in the charge gas.

It is not absolutely necessary, for securing advantages of the invention, that addition of heat to the rich absorption oil in line 19 or at flash drum 27 be entirely avoided, but it is important that the temperature in column 20 be maintained at a relatively low level. Mild heat addition in some instances may be desirable to avoid subnormal temperatures that may give rise to certain operating difficulties. For example, since the flashing operation in drum 27 results in a temperature decrease due to vaporization of absorbed gas, the temperature in the flash zone may drop considerably below normal room temperature and might even become so low as to cause any water that may be present in the absorption oil mixture to freeze. In such case it could be advantageous to add enough heat at the flash zone to avoid the undesirably low temperature. The amount of heat added in any event should be insufficient to raise the temperature in column 20 above 130° F. and preferably should be only such amount as to maintain the temperature within a range of 70–100° F.

In practicing the process tower 20 may be operated at a pressure which is higher, lower or substantially the same as that in the primary absorber. In contrast, the common practice of utilizing a conventional reboiler for the selective stripping operation does not permit of such wide selection of operating pressures, since the stripping must be limited to a pressure that is feasible for reboiler operation which pressure generally is considerably lower than that employed in the primary absorber. The present process has the further advantage of minimizing or avoiding polymerization of certain olefinic constituents that may be present in the charge gas and which tend to undergo polymerization at elevated temperatures. This prevents fouling of the absorption oil during prolonged use in the system.

I claim:

Method of separating hydrogen from a gaseous mixture comprising hydrogen and methane which comprises feeding the gaseous mixture into the lower part of an absorption tower, passing the mixture upwardly countercurrent to an absorption medium under temperature and pressure conditions adapted to absorb a major proportion of the methane, withdrawing from the upper part of the tower a portion of the hydrogen present in said gaseous mixture, passing the rich absorption medium from the base of said absorption tower directly to a second tower and introducing it therein at an intermediate level, passing additional absorption medium into the upper part of said second tower and downwardly therethrough, removing from the base of said second tower absorption medium containing absorbed gas and introducing it directly into a flash zone, maintaining said flash zone under reduced pressure thereby partially vaporizing the absorbed gas, passing the vaporized gas directly to a compressing zone and thereby compressing it to a pressure above that in said second tower, returning the compressed gas to the lower part of the second tower to selectively strip hydrogen from the downflowing absorption medium, withdrawing hydrogen from the upper part of the second tower, and withdrawing absorption medium containing absorbed methane from the reboiler.

References Cited in the file of this patent

UNITED STATES PATENTS

| Number | Name | Date |
|---|---|---|
| 1,900,655 | Metzger | Mar. 7, 1933 |
| 1,934,029 | Asbury | Nov. 7, 1933 |
| 1,953,043 | Cole et al. | Mar. 27, 1934 |
| 2,217,429 | Balcar | Oct. 8, 1940 |
| 2,325,588 | Brandt | Aug. 3, 1943 |
| 2,350,256 | Shiras et al. | May 30, 1944 |
| 2,522,059 | Ray et al. | Sept. 12, 1950 |
| 2,608,270 | McDonald Jr. et al. | Aug. 26, 1952 |
| 2,613,132 | Hutchinson | Oct. 7, 1952 |

FOREIGN PATENTS

| Number | Country | Date |
|---|---|---|
| 866,780 | France | Sept. 3, 1941 |